United States Patent
Hoffman et al.

(10) Patent No.: US 10,827,819 B2
(45) Date of Patent: Nov. 10, 2020

(54) CARRYING SYSTEM FOR CARRYING AN OBJECT

(71) Applicant: Carsten Hoffman, Munich (DE)

(72) Inventors: Carsten Hoffman, Munich (DE);
Carina Deuschl, Munich (DE)

(73) Assignee: Carsten Hoffman, Munich (DE)

( * ) Notice: Subject to any disclaimer, the term of this patent is extended or adjusted under 35 U.S.C. 154(b) by 0 days.

(21) Appl. No.: 16/074,816

(22) PCT Filed: Jan. 25, 2017

(86) PCT No.: PCT/EP2017/051482
§ 371 (c)(1),
(2) Date: Aug. 2, 2018

(87) PCT Pub. No.: WO2017/133937
PCT Pub. Date: Aug. 10, 2017

(65) Prior Publication Data
US 2019/0038010 A1 Feb. 7, 2019

(30) Foreign Application Priority Data

Feb. 3, 2016 (DE) .......... 10 2016 101 876
May 17, 2016 (DE) .......... 10 2016 208 412

(51) Int. Cl.
*A45F 5/00* (2006.01)
*A45C 13/30* (2006.01)
(Continued)

(52) U.S. Cl.
CPC ............... *A45F 5/00* (2013.01); *A45C 13/30* (2013.01); *G03B 17/56* (2013.01); *G03B 17/561* (2013.01);
(Continued)

(58) Field of Classification Search
CPC .......... A45F 2005/002; A45F 2005/006; A45F 2200/0533; A45F 2003/142; A45F 5/022;
(Continued)

(56) References Cited

U.S. PATENT DOCUMENTS 2,470,941 A * 5/1949 Orton ................ A01K 65/00
224/103
4,125,211 A * 11/1978 Handsman ............... A45F 5/00
224/255
(Continued)

FOREIGN PATENT DOCUMENTS

| CN | 203630494 U | 6/2014 |
|---|---|---|
| EP | 3127450 A1 | 2/2017 |
| JP | 2006130264 A | 5/2006 |

OTHER PUBLICATIONS

International Search Report for PCT/EP2017/051482, dated Apr. 13, 2017.

*Primary Examiner* — Scott T McNurlen
(74) *Attorney, Agent, or Firm* — Marshall, Gerstein & Borun LLP (57) ABSTRACT

A carrying strap (1) having a strap band (2) and at least one fastening device (4) for fastening a portable object (10), such as a camera, for example. At least one first rapid closure element (5) is fastened to the strap band (2), said element being a constituent part of a rapid closure mechanism which comprises the first (5) and a corresponding second rapid closure element (6). The first rapid closure element (5) can be released from the corresponding second rapid closure element (6) along a first direction (X) from a locking position, in which the second rapid closure element (6) is locked with the first rapid closure element (5), and can be brought into the locking position along a second direction (Y).

15 Claims, 9 Drawing Sheets

(51) Int. Cl.
  *G03B 17/56*  (2006.01)
  *A45F 3/14*   (2006.01)
  *A45F 3/04*   (2006.01)
  *A45F 5/02*   (2006.01)

(52) U.S. Cl.
  CPC .............. *G03B 17/563* (2013.01); *A45F 3/04* (2013.01); *A45F 5/02* (2013.01); *A45F 2003/142* (2013.01); *A45F 2005/002* (2013.01); *A45F 2005/006* (2013.01); *A45F 2200/0533* (2013.01)

(58) Field of Classification Search
  CPC ........ A45F 5/00; A45F 5/02; Y10T 24/45047; A44B 11/258; A44B 11/263; A44B 11/2584
  USPC ........ 224/578–579, 583, 600, 607, 908–909; 294/136; 24/342.1, 107, 108, 114.1, 24/114.4, 589.1, 665, 666
  See application file for complete search history.

(56) References Cited

U.S. PATENT DOCUMENTS

| | | | | |
|---|---|---|---|---|
| 5,695,101 | A  * | 12/1997 | Frietze | A45F 3/14 224/250 |
| 6,233,788 | B1 * | 5/2001  | Choy    | A45F 5/02 224/197 |
| 6,848,207 | B1 * | 2/2005  | Powell  | G09F 3/207 224/257 |
| 8,726,472 | B2 * | 5/2014  | Lu      | B60P 7/0815 24/265 CD |
| 2012/0248793 | A1 * | 10/2012 | Fiedler | A44B 11/258 292/163 |
| 2013/0101784 | A1 | 4/2013 | Henry et al. | |
| 2013/0299540 | A1 * | 11/2013 | Avganim | A45C 13/18 224/600 |
| 2014/0231482 | A1 * | 8/2014 | Chamberlayne | A45F 5/00 224/623 |

* cited by examiner

CARRYING SYSTEM FOR CARRYING AN OBJECT

CROSS-REFERENCE TO RELATED APPLICATIONS

This is the United States National Stage of PCT Application No. PCT/EP2017/051482, filed Jan. 25, 2017, and which claims priority to German Patent Application No. 102016208412.7, filed May 17, 2016, and German Patent Application No. 102016101876.7, filed Feb. 3, 2016. The entire contents of each of the foregoing applications are incorporated herein by reference in their entirety.

FIELD OF DISCLOSURE

The present invention refers to a carrying strap having a strap band and at least one fastening device for fastening a portable object, such as a camera. The invention also refers to a carrying system having such a carrying strap and a fixing device, by means of which the carrying strap may be fastened to a piece of clothing or a backpack.

BACKGROUND

Carrying devices for carrying cameras, pocket devices or other mobile devices are available in various forms. Lighter cameras, such as small-format cameras, are usually provided with a hand loop, which is positioned on the hand. Heavier cameras, such as reflex cameras, in contrast, are usually carried with a neck or shoulder strap, which the wearer carries around the neck or over the shoulder.

Other carrying systems are also known in the art, wherein a camera is fastened by means of short belts to the shoulder straps of a backpack. The camera hangs during walking freely downwards and is held by the shoulder straps of the backpack. Such a carrying system is however affected by the drawback that the freedom of movement during use of the camera is severely limited, since the fastening belts are usually relatively short. A free manipulation of the camera is thus hampered, in particular when the camera has to be held in front of the eye or within the field of vision. An extension of the belts would improve the mobility; however, it would inevitably cause the camera to dangle excessively in front of the body during walking. A further drawback is that the connection for some types of shots have to be manually released. Such a system is known from JP 2006 130 264 A, for example. This system is provided, in addition to the carrying strap of the camera, with two additional fastening belts between the carrying strap and the shoulder straps of the backpack. The fastening belts may be released by a clip closure, so that the camera may be separated from the backpack. The separation and connection are however relatively cumbersome, since normally both hands are required to this end. In case of connected fastening belts it is not possible, for example, to raise the camera above the head, in order to shoot over crowds. Also, it is not possible to use the camera on the extended arm at eye height. Since modern cameras are provided with displays for image composition, the described types of shoots are currently relatively common.

GENERAL DESCRIPTION

An object of the invention is thus to provide a carrying strap and a carrying system for carrying objects, in particular cameras or other mobile devices, by means of which the object may be fastened in such a way that it minimally dangles while walking and at the same time allows an almost unconstrained manipulation of the fastened object.

This object is achieved according to the invention by the characteristics indicated in the dependent claims. Further embodiments of the invention are provided by the dependent claims.

According to the invention, a carrying strap is proposed, which has a strap band and at least one fastening device for fastening a portable object, such as a camera, for example, wherein at least one first rapid closure element is fastened (directly or indirectly) to the strap band, said element being a component of a rapid closure mechanism which comprises the first and a corresponding second rapid closure element, wherein the first rapid closure element is disengageable from the corresponding second rapid closure element along a first direction from a locking position, in which the second rapid closure element is locked with the first rapid closure element, and is transferable along a second direction into the locking position. The first rapid closure element is preferably provided in such a way that by simply pulling the strap band, it may be disengaged from the corresponding second rapid closure element. The second rapid closure element may be positioned on a piece of clothing or a backpack, for example. In the suspended or coupled or locked state of both rapid closure elements, the carried object is held by the piece of clothing or the backpack. When the object has to be used, it may be released by simply pulling and/or pushing or sliding the strap band off the piece of clothing or backpack. A camera, which is carried by means of a strap band, which is formed as a shoulder or neck strap, may be suspended, in the inactive state, by means of the rapid closure mechanism, on a piece of clothing or a backpack.

When the camera has to be used, it may be disengaged from the piece of clothing or backpack by pulling the strap band and may be positioned in front of the eye or within the field of vision, but also over the head or on an extended arm at eye height of the photographer, without requiring additional manipulations to this end. In the released state, the photographer may manipulate the camera as desired, since the freedom of movement is no more hampered by the now released rapid closure.

The first rapid closure element positioned on the carrying strap may for example be directly fastened to the strap band or may be indirectly connected to the strap band, such as through a belt or a line. The first rapid closure element may also be applied to flap-like elements, which protrude from the strap band.

The displacement of the camera into the locking position after use is also easy. The strap band is preferably provided to this end with a rigidity such that when displacing the ends of the strap band for locking in the direction of an apex of the essentially U-shaped strap band, at least regions of two legs of the strap band extending away from the apex are moved from each other in an arcuate way in the region of the locking position. In practice, a portable object, such as a camera, is often provided at two opposite ends with eyelets for holding a strap band. The strap band is connected to the portable object by means of two fastening devices. By raising the portable object or the ends of the strap band, which represents in this case a parallel displacement, the first rapid closure elements are moved upwards and/or outwards.

In use, such as when suspending the camera around the neck, the strap band has a U-shape between these two fastening points. The strap band has the apex at one end opposite the portable object, i.e. in the region, in which the strap band rests on the neck of the wearer, for example. From this apex two legs extend to the at least one fastening device.

In an alternative embodiment, the strap band is only provided with a single fastening device, by which the camera may be fastened to a tripod thread, for example. In such a case both legs extend respectively from the fastening device to the apex or from the apex to the fastening device. In such an embodiment, the strap band may be shaped like a closed ring.

The inventive strap band has a rigidity such that in case of a displacement of the ends of the strap band towards the apex, at least regions of the legs of the strap band move from each other in an arcuate way. The regions moving from each other in an arcuate way move into the region of the locking position. In practice, often two second rapid closure elements are fastened to a piece of clothing or to shoulder straps of a backpack. Both second rapid closure elements are further spaced apart than both first rapid closure elements, which are positioned on the strap band. In order to bring the first rapid closure elements into engagement with the respective second rapid closure elements, both first rapid closure elements have to be moved apart from each other. The inventive device is advantageous in that by raising the camera or the fastening device or the ends of the strap band, both first rapid closure elements may be brought into the region of the second rapid closure elements, in order to lock both corresponding rapid closure elements. Moreover, both ends of the strap band may be moved apart, whereby both first rapid closure elements also move from each other in the region of the second rapid closure elements due to the rigidity of the strap band. To this end, the camera has not to be previously set down and the first rapid closure elements or the strap band have not to be directly grasped and brought into the region of the second rapid closure elements.

To this end, the rigidity has to be selected in a suitable way. If the rigidity of the strap band is too low, then when raising the camera or the ends of the strap band, on both sides of the portable object a respective U-shaped loop will dangle downwards, without both legs moving from each other or upwards. This is the case, for example, in conventional supporting straps for cameras. If the rigidity of the strap band is excessive, then the strap band separates from the neck of the wearer, without the U-shape being changed. Thus, an average rigidity between these two extremes has to be chosen, which provides the desired inventive strap band. The bending behavior may be assisted by the U-shape of the strap band in the sense that the strap band already has, in sections, an arcuate configuration and this configuration is reinforced or expanded. Thus, the motion direction for forming the arc is already set. Both the pushing rigidity in the longitudinal direction of the strap band and the bending rigidity in the transversal direction influence the rigidity and the behavior of the strap band.

The term "strap" or "strap band" in the context of the present application comprises all band-like or rope-like elements, such as a flat band, a belt, a piece of rope, such as for climbing or a static rope, and similar. The claims correspondingly extend to all embodiments and are in particular not limited to flat straps. In order to obtain the desired rigidity of the strap band, for example, a steel line may be integrated into a fabric strap band or the steel line may be surrounded by a textile strap band. The same may be achieved with a plastics element. Alternatively, a strap band made of fabric may be reinforced with fibers, which are woven into the fabric. Fibers may for example be carbon or composite fibers. In a further embodiment, the desired stability/rigidity is also obtained by a corresponding manufacturing of the strap band, in particular a corresponding weaving or joining technique. The strap band in this case is provided in particular with an essentially circular cross-section.

Above said rapid closure mechanism is preferably adapted in such a way that the corresponding first and second rapid closure elements in the coupled state form a form-fitting connection. The rapid closure mechanism may for example be a hook or push-button mechanism. Additionally, the rapid closure mechanism may also comprise a magnet or a snap connection. The magnet is configured in such a way that it facilitates the locking process along the first direction. Thus, the first rapid closure element is simply brought into the area of the second rapid closure element and the magnetic force causes a movement of the first rapid closure element in the second direction. The second direction is preferably such that it is perpendicular to the U-shaped strap band and/or is directed towards the body of the wearer. In a preferred embodiment, the first direction is perpendicular to the second direction and is preferably directed, in use of the strap, essentially against the direction of gravity. This causes an undesired disengagement of the first rapid closure element from the second rapid closure element is hampered by gravity. Alternatively, such an undesired release may be prevented by an additional safety device such as a latch, a retaining element providing a holding force such as a spring or similar. The first and the second direction for opening or closing are preferably opposite or perpendicular to each other.

According to a preferred embodiment of the invention, the rapid closure mechanism is configured in such a way that the corresponding first and second rapid closure elements disengage from each other only by pulling or pushing in a specific direction, i.e. in the first direction, while not disengaging by pulling in another direction.

The rapid closure mechanism is preferably provided in such a way that the connection is automatically released once the object—in particular a camera or other optical device—is brought in front of the eye or within the field of vision. Preferably the rapid closure mechanism may be opened only along one first direction, such as by pulling the strap band in this direction. The first direction is in particular such that while wearing, it is directed upwards. When pulling downwards, forward or sideways, the rapid closure mechanism should not move. In such an embodiment, the rapid closure mechanism is held by gravity in the locking position.

According to a special embodiment of a carrying strap having two first rapid closure elements, these rapid closure elements are preferably positioned on the strap band at the same distance from the fastening devices or link points, respectively, at which the worn object is fastened to the carrying strap.

In carrying straps having a single link point—such as a threaded device for fastening a camera to its tripod thread—both first rapid closure elements are preferably positioned at the same distance from the link point.

Both first rapid closure elements are preferably positioned on the strap band (directly or by means of a cantilever/flap), in such a way that when it is carried around the neck, in the hooked or attached state, behind the head, it has a couple of cm play, so that the strap band is relieved from loads.

The position of the rapid closure mechanism, in particular of the first rapid closure element, may be preferably adjusted both with respect to the wearable object and to the apex of the strap band. Thus, while wearing the same, the length to apex may be adjusted in such a way that, in the locked state, the strap band does not rest on the neck of the wearer. The wearing height of the wearable object may be set via the length between the first rapid closure element and the fastening device. In a first alternative, the carrying strap is preferably provided with at least two length adjustments, so that the length of the carrying strap may be adjusted both above and below a rapid closure element. The length adjustment above the rapid closure element allows the length to be adapted to different body sizes and different clothing (scarf, jacket with hoodie, etc.). The length adjustment below the first rapid closure element allows the object to be worn at the desired height.

In a second alternative, the first rapid closure element may be displaced and also fixed along the strap band. By fixing in a position, both the length to the apex and the distance from the fastening devices may be adjusted. The fastening devices may also have additional length adjustment devices, in particular in order to adjust the total length of the carrying strap. The preferably continuously slidable rapid closure elements may be fixed by means of a clamp on the strap band. In a particularly preferred embodiment, the clamping is performed by an eccentric, which exerts a force which is essentially perpendicular to the longitudinal extension of the strap band. The strap band is held in a strap recess on the first rapid closure element and by rotating the eccentric a clamping force is exerted on the strap band. The eccentric or the clamping element transmitting the clamping force to the strap band may be provided in the area of the engagement with the strap band in particular with a profiled surface, such as scales, corrugations, teeth or similar.

The present invention also refers to a carrying system having a carrying strap according to any of the previously described embodiments as well as an adapter with at least one second rapid closure element, wherein the adapter is adapted in such a way that it may be worn on a piece of clothing or a backpack.

The adapter preferably comprises a fixing device, such as a Velcro fastener, a pushbutton mechanism or a rubber belt or an elastic clamping connection, by which it may be rapidly and easily fastened to the carrying device (such as a piece of clothing or a backpack).

The adapter or the fixing device may be adapted as a sort of clip, for example, having two arms, which are pivotally connected to each other on one side. On the other side of the arms a latch mechanism may be provided, for example.

According to another embodiment, the adapter may also comprise two plates, which may clamp a shoulder strap of a backpack or another part of the carrying device. Many further embodiments are also conceivable.

BRIEF DESCRIPTION OF THE DRAWINGS

Preferred embodiments of the inventive carrying strap or of the inventive carrying system are explained in the following by means of the figures. In particular.

DETAILED DESCRIPTION

Figure 1:
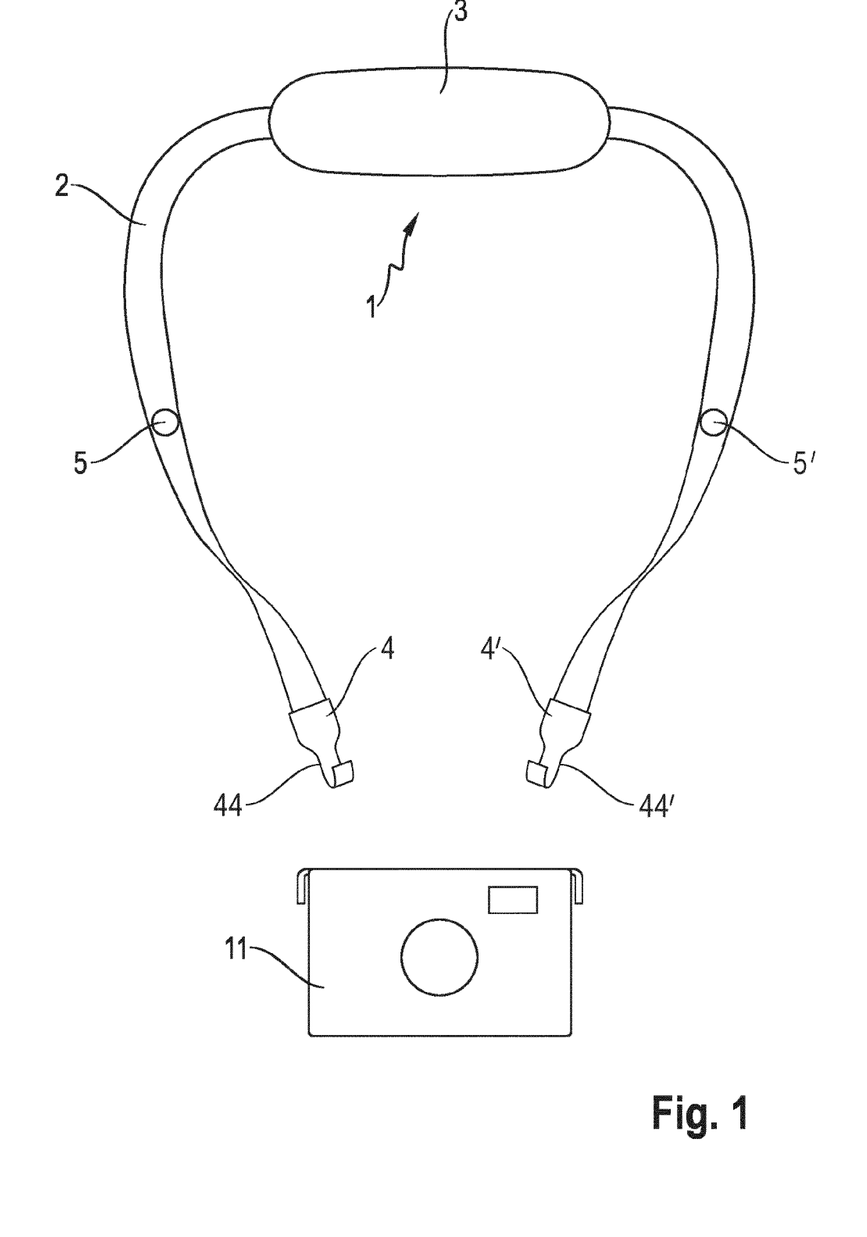
FIG. 1 shows a schematic representation of a first inventive carrying strap for carrying a camera or another mobile object.

FIG. 1 shows a first embodiment of an inventive carrying strap 1 for carrying a camera 10 or any other portable object, which may be laid around the neck or which may be carried over the shoulder, for example. The carrying strap 1 essentially comprises a strap band 2 having a padding 3. On both ends of the strap band 2 a respective link point with a fastening device 4, 4' is provided for fastening the portable object. In the example shown, on the strap ends a respective hook 44, 44' is provided as a fastening device 4, 4'. Alternatively, also any other fastening device known in the art may obviously be used.

If an inventive carrying strap is carried around the neck or over the shoulder, the neck or the shoulder of the wearer is constantly subject to the weight of the object worn. In order to avoid this, the carrying strap shown in figure comprises two rapid closure elements 5, 5', which are part of a rapid closure mechanism, which comprises both first and a respective second rapid closure element 6 (see FIGS. 2a, 7). The or the second rapid closure elements 6 may be fastened to a backpack or a piece of clothing, for example. In order to carry the camera 10 or another mobile object, the first rapid closure elements 5 are locked with the corresponding second rapid closure elements 6, whereby the weight is transmitted through the lower portion of the strap band 2 to the carrying device carried by the user, such as a backpack or a piece of clothing. The neck or the shoulder of the user are thus relieved.

In order to control the carried object and to bring the camera 10 in front of the eye or within the field of vision, on the extended arm at eye height or over the head, for example, the user has only to move the object from the locked position upwards in the X direction and exert a pulling force directed upwards. The rapid closure mechanism is configured, according to the invention, in such a way that the first rapid closure elements 5, 5' may be disengaged from the corresponding second rapid closure elements 6 simply by pulling the strap band 2. The camera 10 may thus be moved without any hindrance—as long as the carrying strap 1 allows it—, without constraining the photographer.

The first rapid closure elements 5, 5' are configured in such a way that the rapid closure mechanism is released only by pulling in a determined direction, such as upwards in the X direction. On the contrary, when pulling in other directions, such as sideway or downwards, the mechanism is not released.

Both first rapid closure elements 5, 5' are fastened to the strap band 2 in such a way that the strap band 2, when carried around the neck, is relieved on the neck. The weight force of the carried object is absorbed, in this case, by the carrying device worn by the user, such as a vest or a backpack, and is distributed over a large surface on the body of the user.

As may be seen, both first rapid closure elements 5, 5' are approximately at the same distance from the fastening devices 4, 4', so that the weight of the carried object 10 is evenly distributed on the left and right side.

The carrying strap 1 of FIG. 1 preferably comprises a plurality of adjustment devices (not shown), for adjusting the length of the carrying strap 1, i.e. at least a first adjustment device, by means of which the distance between a first rapid closure element 5 and a corresponding fastening device may be adjusted and at least a second adjustment device, by means of which the length of the carrying strap 1 may be varied on the other side of the rapid closure element.

In case of a carrying strap 1 having two first rapid closure elements 5, 5', preferably for each of the rapid closure elements 5, 5' a first adjustment device is provided between the respective rapid closure element 5, 5' and the corresponding fastening device 4, 4'. Moreover at least one adjustment device for adjusting the length of the strap band 2 is positioned between both first rapid closure elements 5. Thus, the length of the strap band 2 may be adapted, on one hand, to different body sizes and different clothing types such as a scarf or a jacket with a hoodie, and on the other hand, the free carrying length, i.e. the distance between the first rapid closure elements 5, 5' and the corresponding fastening devices 4, 4' may be adjusted as desired.

Figure 2A:
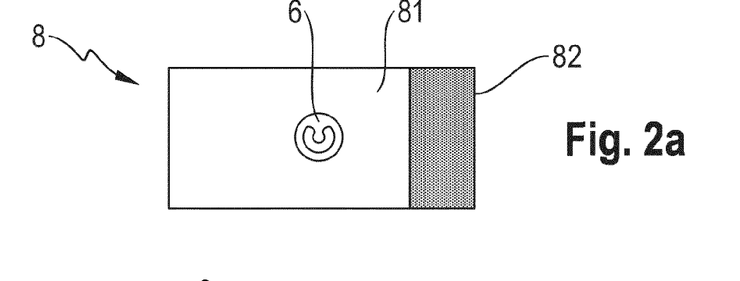
FIGS. 2a, b show views of an adapter for fastening to the shoulder strap of a backpack.

FIG. 2a shows an embodiment of an adapter 8 having a second rapid closure element 6, on which a first rapid closure element may be suspended. The adapter 8 is provided in this case in order to be fastened to the shoulder strap of a backpack. It is formed in this case by a flat piece of fabric 81 having a Velcro closure 82, so that it may be rapidly fastened to the backpack or may be removed therefrom.

Figure 2B:
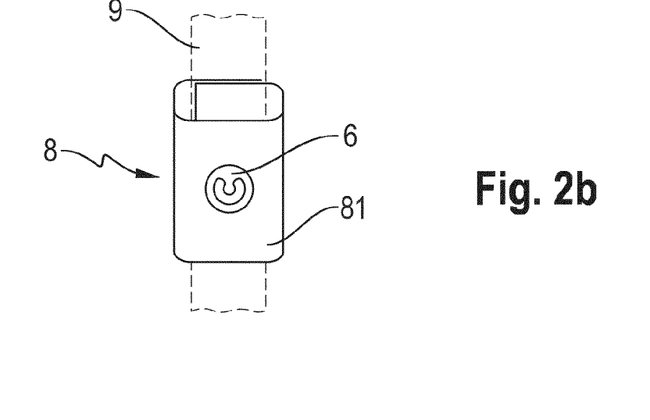

FIG. 2b shows the adapter 8 of FIG. 2a in a state, in which it is fastened to a shoulder strap 9 of a backpack. Other embodiments of an adapter, which may be fastened in another way to the backpack or to a piece of clothing, are also conceivable. The adapter may be suspended to the carrying device or may be fixedly connected thereto. A lot of different possibilities are available to the skilled in the art.

Figure 3:
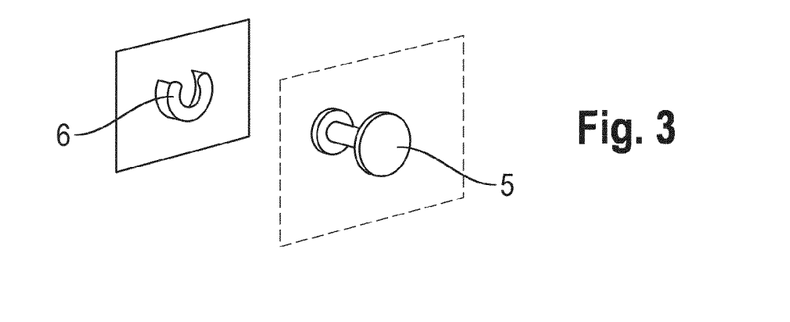
FIG. 3 shows a rapid closure mechanism according to a first embodiment of the invention.

FIG. 3 shows a rapid closure mechanism having a first rapid closure element 5 and a second rapid closure element according to a first embodiment of the invention. The first rapid closure element 5 is provided in this case in the form of a pin having a widened head, which is hooked to a corresponding second rapid closure element 6. The second rapid closure element 6 comprises an opening, into which the head may be introduced from above. The second rapid closure element 6 is closed in other sideways directions, as well as from the front. The rapid closure mechanism may thus be released upwards by a relative motion of the first rapid closure element 5.

Figure 4:
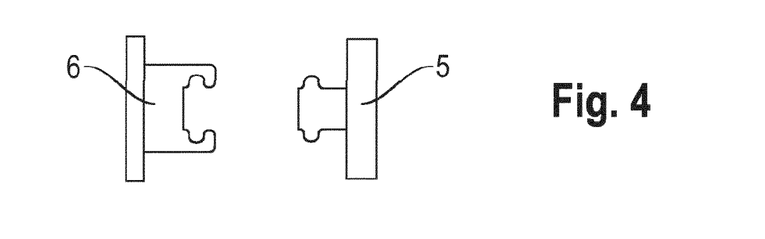
FIG. 4 shows a rapid closure mechanism according to a second embodiment of the invention.

FIG. 4 shows a rapid closure mechanism having a first rapid closure element 5 and a second rapid closure element 6 according to a second embodiment of the invention. The first rapid closure element 5 is formed in this case by a pin having a circumferential bead, which is pressed in its longitudinal direction into the second rapid closure element 6. The first rapid closure element 5 has a mushroom-like head. The second rapid closure element 6 has a corresponding opening, into which the pin may be introduced. When pressing the pin, the second rapid closure element 6 and/or the bead are slightly deformed. The bead finally comes to rest in an undercut of the second rapid closure element 6 and is held there by form-fit. By pulling in the longitudinal direction of the pin, the rapid closure mechanism may be released again.

Figure 5:
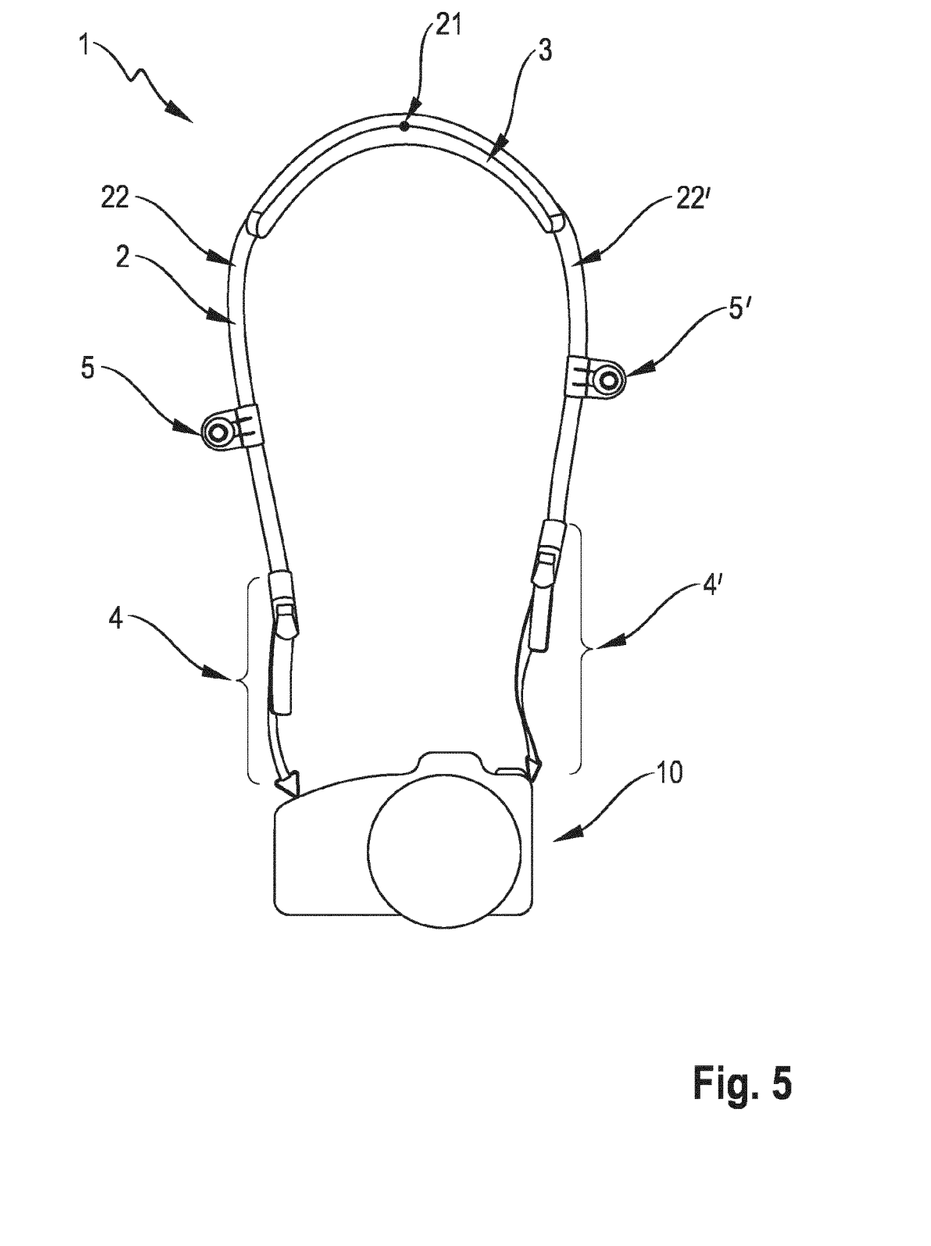
FIG. 5 shows an inventive carrying strap for a portable object according to a third embodiment of the invention, FIGS. 6a, b, c show a first rapid closure element.

FIG. 5 shows a third embodiment of an inventive carrying strap 1 for carrying a portable object, which is formed by a camera 10. The carrying strap has a U-shaped strap band 2 with a round cross-section. The strap band 2 has an apex 21, from which two legs 22, 22' of the strap band 2 extend towards two fastening devices 4, 4'. Both legs 22, 22' have the same length. In the area of the apex 21, the carrying strap 1 has a padding 3. First rapid closure elements 5, 5' are fastened to the strap band 2 between the apex 21 and both fastening devices 4, 4'. The carrying strap 1 is connected to the camera 10 by means of the fastening devices 4, 4'.

In order to hook the first rapid closure elements 5, 5' into the second rapid closure elements 6, it is only required to raise the camera 10 or both ends of the strap band 2. The first rapid closure elements 5, 5' move upwards or outwards to the proximity of the second rapid closure elements 6, which are fastened to the backpack supports 13. As soon as the first rapid closure elements 5, 5' are near the second rapid closure elements 6, the magnetic force of magnets provided in the first/second rapid closure elements are sufficient to attract the first rapid closure elements 5, 5' in the y direction and transfer them to the locking position.

Figure 6A:
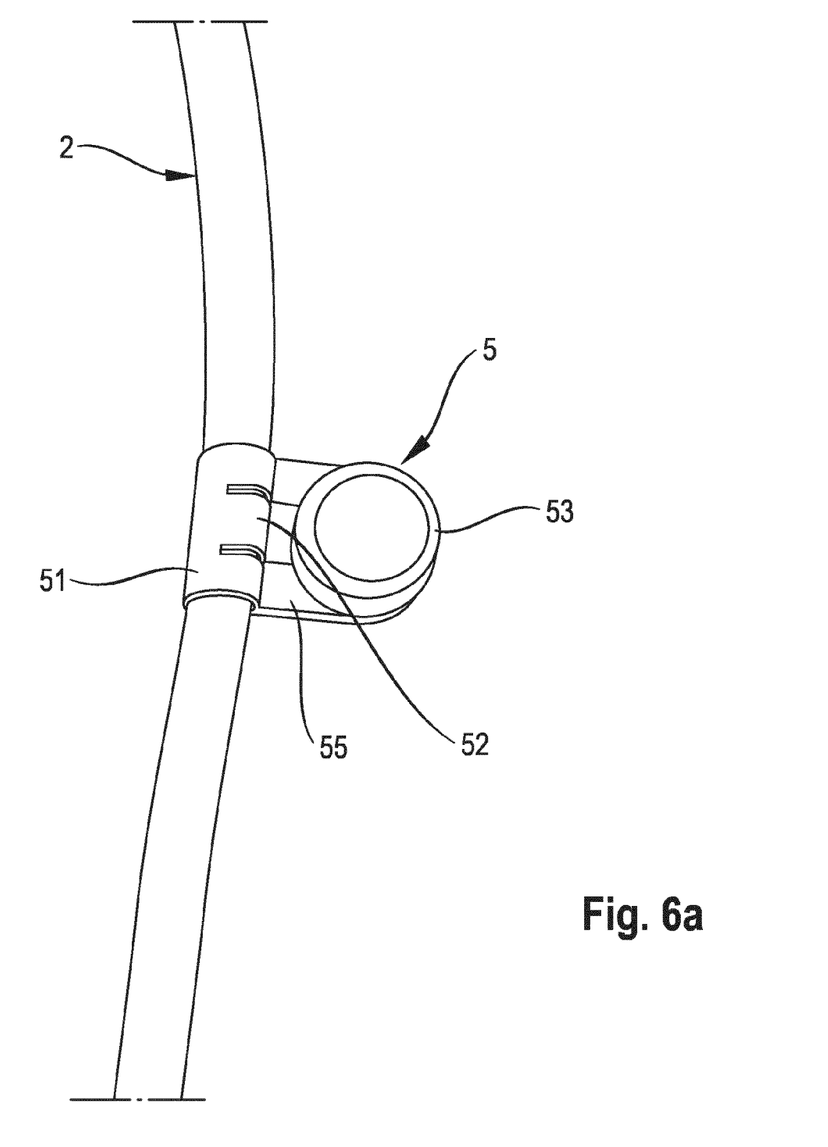
Figure 6B:
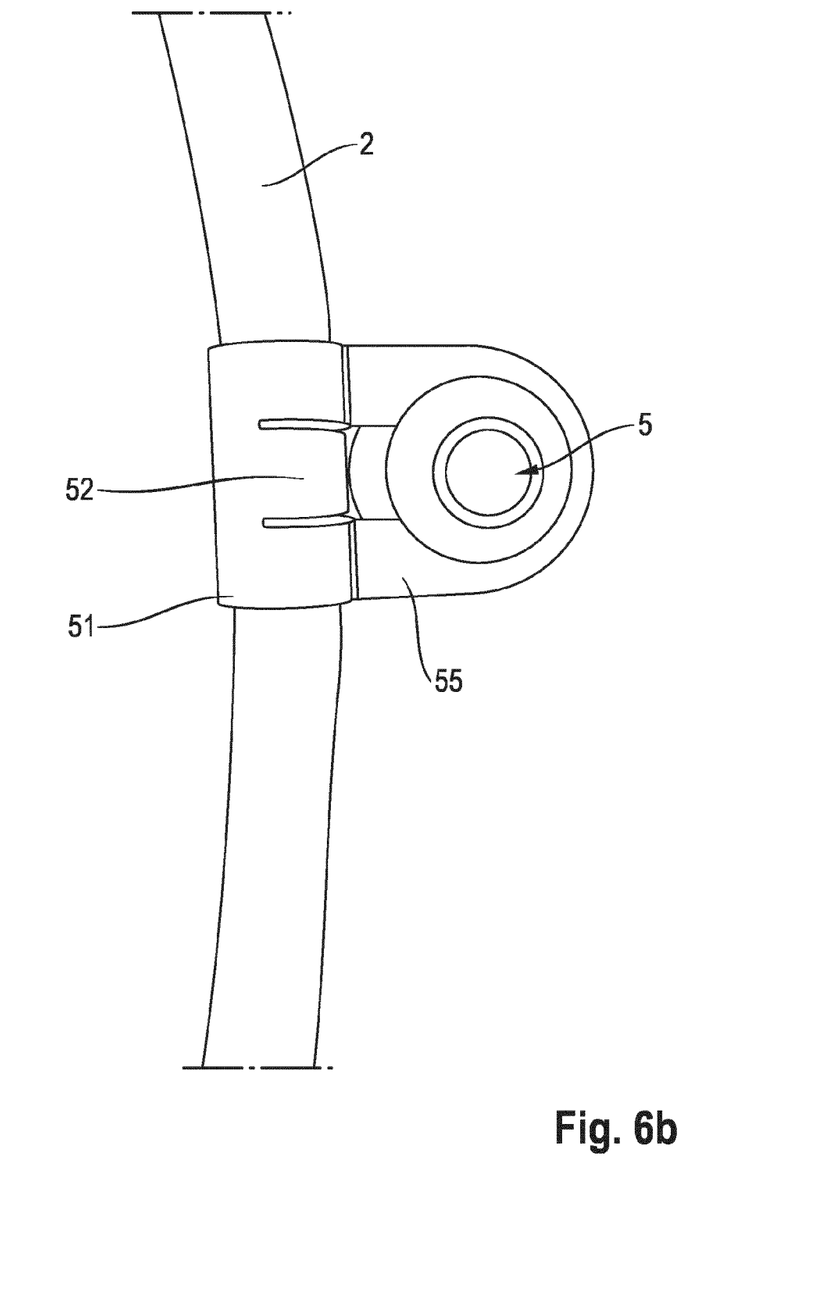
Figure 6C:
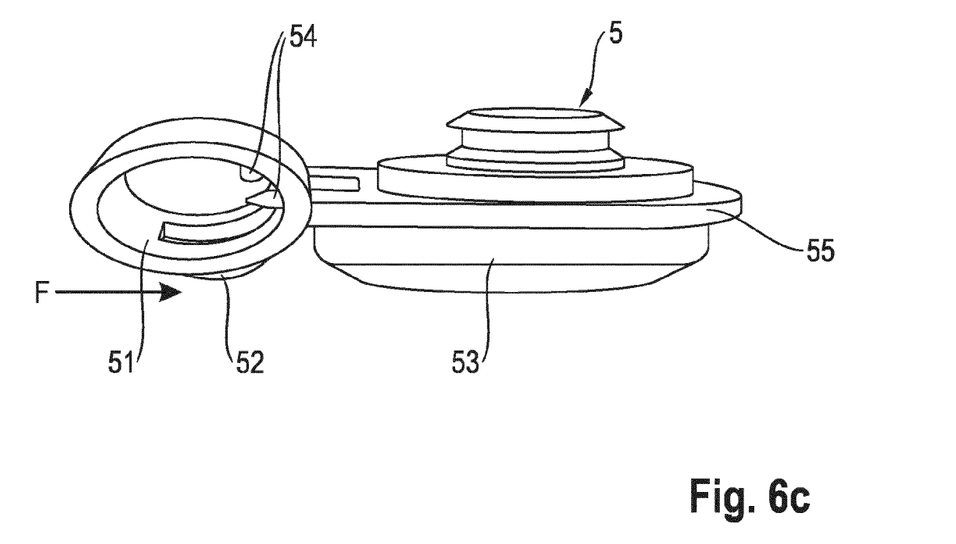

FIG. 6a shows a first rapid closure element 5 on the strap band 2 in more detail. The first rapid closure element 5 is connected through a tubular strap band passage 51 to the strap band 2. The strap band 2 extends through the tubular strap band passage 51. The strap band passage 51 has a clamp element 52. The strap band passage 51 or the first rapid closure element 5 may be fixed through the clamp element 52 along the strap band 2. To this end, an eccentric 53 formed by a screw with an eccentrically formed head is positioned in such a way that when rotating it moves the clamp element 52 towards the strap band 2. The clamp element 52 also has barbs or teeth 54 on its side facing the strap band 2, which engage with the strap band 2 when clamping (see FIG. 6c). The first rapid closure element 5 in the illustration of FIG. 6 is covered by the eccentric 53 and is positioned on its backside. FIG. 6b shows the backside with the first rapid closure element 5. The first rapid closure element essentially has a circular head with a circumferential undercut and thus has a mushroom-like shape.

As shown in the side view of the strap band passage 51 in FIG. 6c, the clamp element 52 has teeth 54. The teeth 54 engage in the strap band 2, not shown. By applying a force F, the teeth are extracted from the engagement with the strap band 2, so that the strap band passage 51 may be displaced along the strap band.

Figure 7:
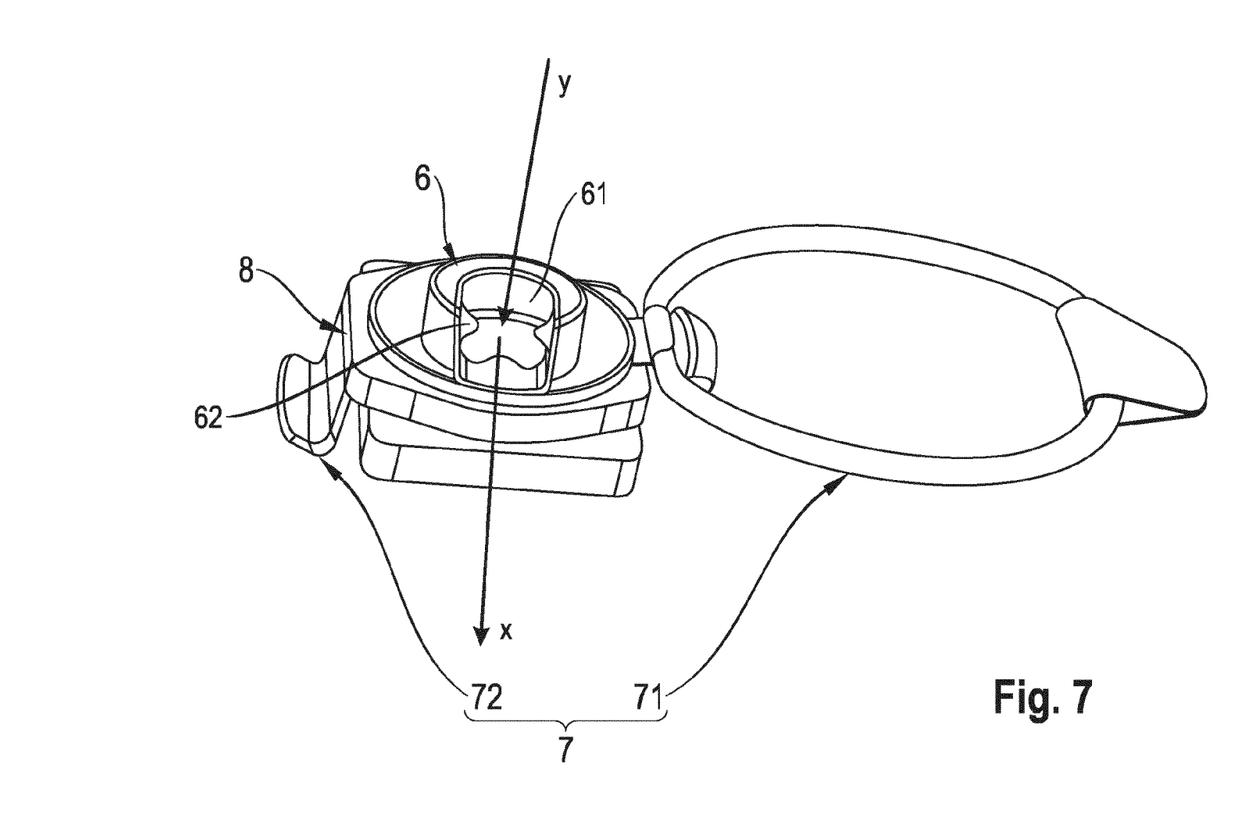
FIG. 7 shows a second rapid closure element of an inventive carrying system including the adapter and the fixing device, FIGS. 8a, b show the second rapid closure element on a shoulder strap of a carrying device.

FIG. 7 shows the second rapid closure element 6 including the adapter 8 and the fixing device 7. The second rapid closure element 6 has a recess 61 for the first rapid closure element 5. The first rapid closure element 5, in particular the mushroom head of the rapid closure element 5, maybe introduced into the recess 61 in the Y direction. The Y direction is here essentially perpendicular to the bottom surface of the second rapid closure element 6 or of the adapter 8. In the X direction, which is perpendicular to the Y direction, the first rapid closure element 5 may be disengaged from the second rapid closure element 6. In all other directions, the first rapid closure element 5 is form-fittingly connected to the second rapid closure element 6. The second rapid closure element 6 has a spring element 62. Through the spring ring 62, a release, which does not happen in the X direction, is prevented, and through the elastic force of the spring ring 62 an (involuntary) release in the X direction is prevented or hampered. Additionally, both rapid closure elements 5, 6 are held by magnets (not shown) in the locking position. The magnets are positioned in the mushroom head of the first rapid closure element 5 or in the bottom of the second rapid closure element 6.

Figure 8A:
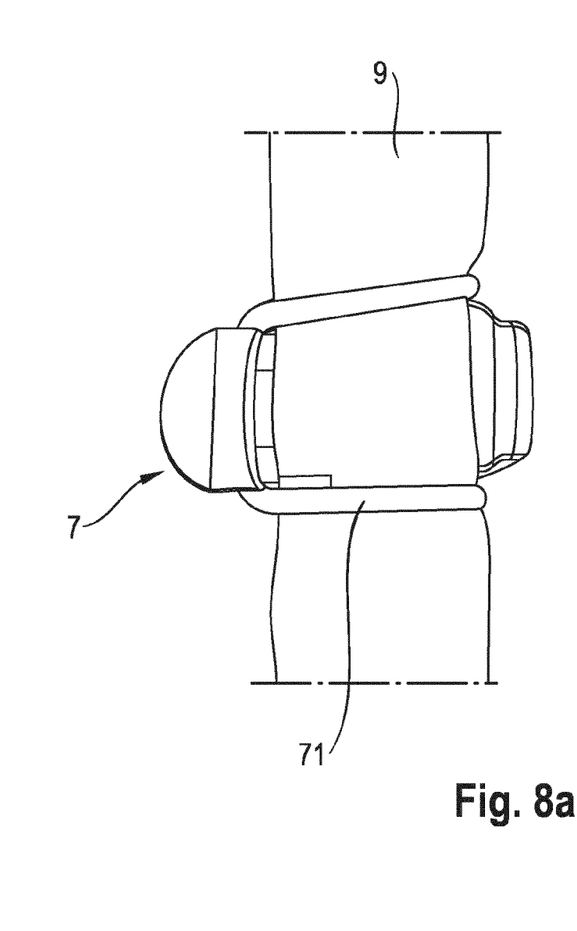
Figure 8B:
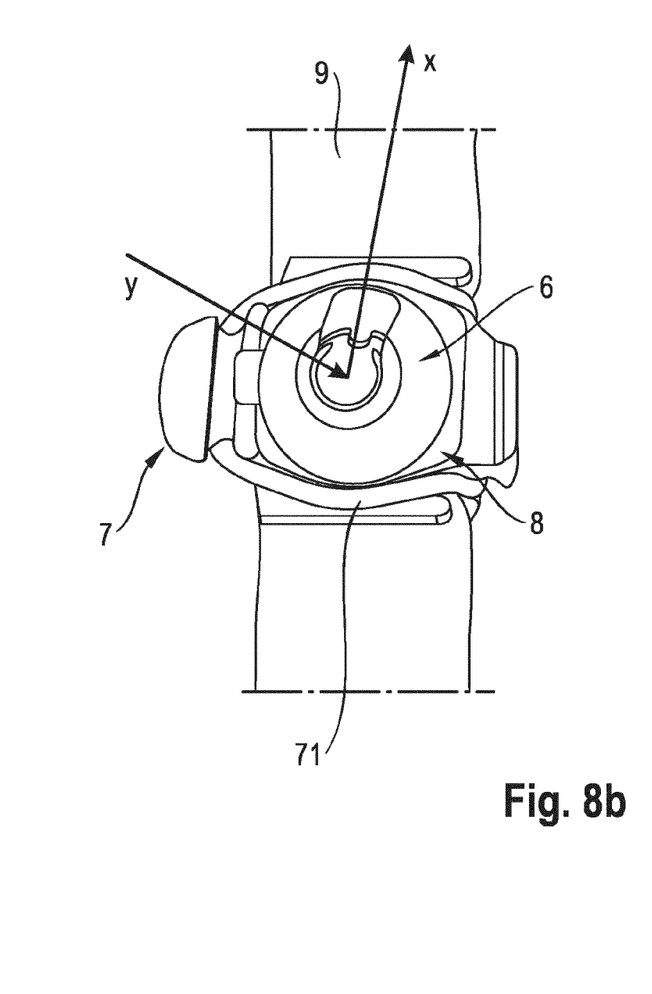

A fixing device 7 formed by an elastic band 71 is positioned on the adapter 8. The elastic band 71, as exemplarily shown in FIGS. 8a, b, may be wound around the supporting device, such as the shoulder strap 9 of a backpack and may be fastened to the same. To this end, the elastic band 71 is suspended in a hook 72. Thus, the second rapid closure element 6 may be easily fastened to the supporting device 9 and is flexibly usable.

Figure 9:
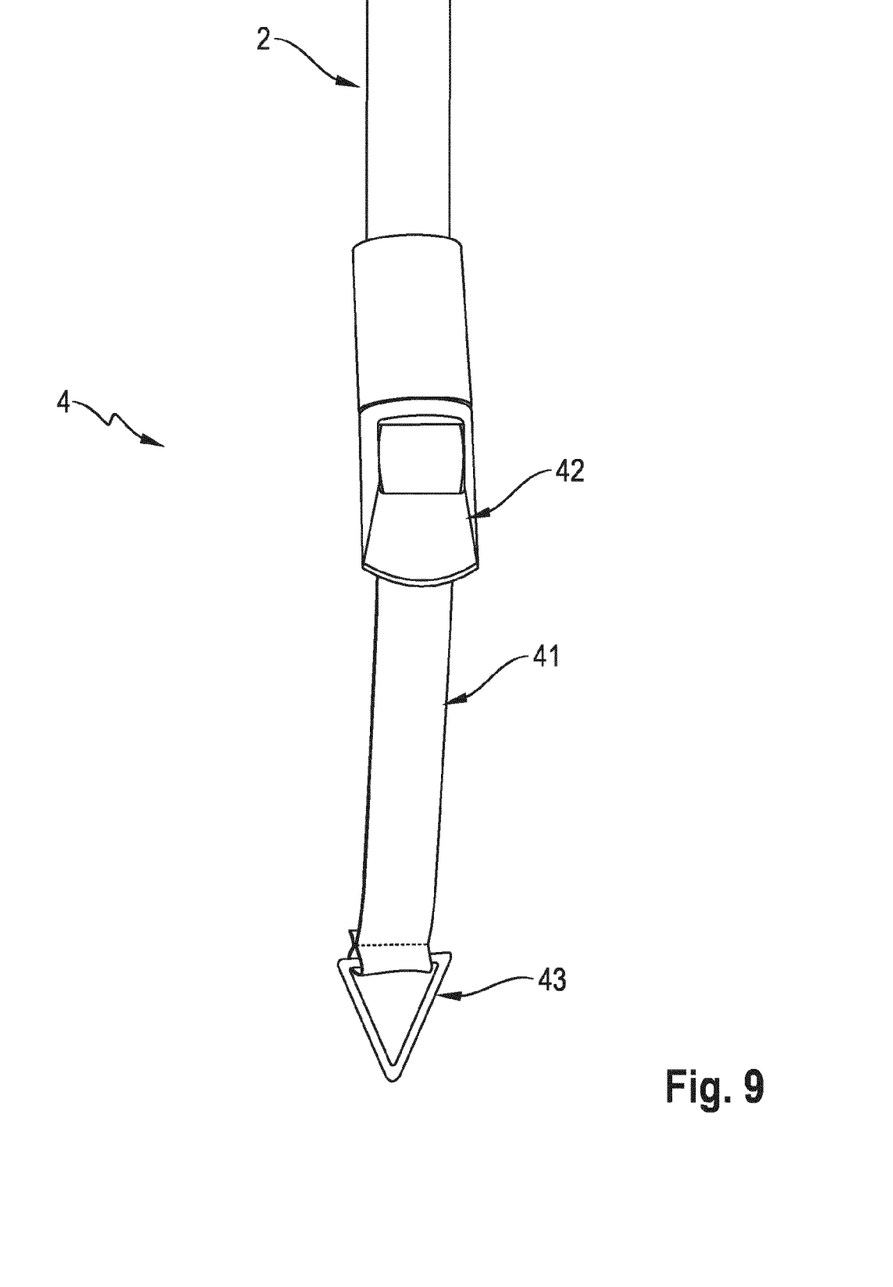
FIG. 9 shows a fastening device.

FIG. 9 shows the fastening device 4. The fastening device 4 is directly abutting the round strap band 2 and is removably connected thereto at the end of the strap band 2. The fastening device 4 comprises an eyelet 43, which may be connected to the object to be carried, i.e. the camera 10. The eyelet 43 is connected to a flat band 41. The flat band 41 is connected through a length adjustment device 42 with the strap band 2.

The invention claimed is:

1. A carrying strap having a strap band for carrying a portable object around a neck and at least one fastening device, which is positioned on at least one end of the strap band, for fastening the portable object, such as a camera, for example,
   characterized in that
   at least one first rapid closure element is fastened to the strap band, said element being a component of a rapid closure mechanism which comprises the first and a corresponding second rapid closure element, wherein the second rapid closure element is fastened to a piece of clothing or to a strap of a backpack,
   wherein the first rapid closure element is disengageable from the corresponding second rapid closure element along a first direction (X) from a locking position, in which the second rapid closure element is locked with the first rapid closure element, and is transferrable along a second direction (Y) into the locking position and
   the first rapid closure element is displaceable along the strap band and is fastenable to the strap band,
   wherein the first and the second direction (X, Y) are perpendicular to each other,
   wherein the strap band has an essentially circular cross-section, and
   the first rapid closure element is fastened through a tubular strap band passage to the strap band and the strap band is fixable through an eccentrically formed head of a screw in the strap band passage.

2. The carrying strap of claim 1, characterized in that the strap band is essentially U-shaped and has a rigidity such that in case of a displacement of the ends of the strap band towards an apex of the essentially U-shaped strap band, at least regions of two legs of the strap band extending from the apex move away from each other in an arcuate way in the region of the second rapid closure element.

3. The carrying strap of claim 1, characterized in that the rapid closure mechanism is provided in such a way that the corresponding first and second rapid closure elements form a form-fitting connection.

4. The carrying strap of claim 1, characterized in that the first rapid closure element is held by a magnet and/or a snap fit in the locking position.

5. The carrying strap of claim 1, characterized in that the first rapid closure element is fixable in the locking position by means of a securing element.

6. The carrying strap of claim 1, characterized in that the strap band is at least portion-wise reinforced by a steel line, a plastics element or reinforcing fibers, which are woven into a fabric.

7. The carrying strap of claim 1, characterized in that the first rapid closure element is fixable by clamping to the strap band, in order to prevent its displacement, by rotating the eccentrically formed head of the screw.

8. The carrying strap of claim 1, characterized in that the corresponding first and second rapid closure elements are disengageable from each other only along the first direction (X).

9. The carrying strap of claim 1, characterized in that the strap band has at both its ends a respective fastening device for connecting to the portable object, at least two first rapid closure elements are fastened to the strap.

10. The carrying strap of claim 9, characterized in that both first rapid closure elements are fastened to the strap band at the same distance from the corresponding fastening device.

11. A carrying system for carrying an object on the body, comprising a strap band of claim 1, at least one adapter, which is connected to the second rapid closure element and a fixing device for fastening the adapter to a carrying device.

12. The carrying system of claim 11, characterized in that the carrying device is a shoulder strap of a backpack.

13. The carrying system of claim 12, characterized in that the first rapid closure element is held by gravity in the locking position during use of the carrying device.

14. The carrying system of claim 11, characterized in that the fixing device has a Velcro fastener or a rubber band.

15. A carrying strap having a strap band and at least one fastening device, which is positioned on at least one end of the strap band, for fastening a portable object, such as a camera, for example,
    characterized in that
    at least one first rapid closure element is fastened to the strap band, said element being a component of a rapid closure mechanism which comprises the first and a corresponding second rapid closure element, wherein the first rapid closure element is disengageable from the corresponding second rapid closure element along a first direction (X) from a locking position, in which the second rapid closure element is locked with the first rapid closure element, and is transferrable along a second direction (Y) into the locking position,
    the first rapid closure element is displaceable along the strap band and is fastenable to the strap band,
    the strap band has an essentially circular cross-section, and the first rapid closure element is fastened through a tubular strap band passage to the strap band and the strap band is fixable through an eccentrically formed head of a screw in the strap band passage.

* * * * *